(12) United States Patent
Joung et al.

(10) Patent No.: US 8,131,285 B2
(45) Date of Patent: Mar. 6, 2012

(54) TRANSMISSION/RECEPTION CHANNEL MATCHING APPARATUS FOR MOBILE COMMUNICATION TERMINAL AND MOBILE PHONE TEST EQUIPMENT

(75) Inventors: Jinsoup Joung, Seongnam (KR); Kyeongmin Ha, Seongnam (KR); Jongmin Kim, Daejeon (KR); Sunglyong Lim, Seongnam (KR)

(73) Assignee: Innowireless Co., Ltd., Seongnam-si (KR)

( * ) Notice: Subject to any disclaimer, the term of this patent is extended or adjusted under 35 U.S.C. 154(b) by 957 days.

(21) Appl. No.: 12/126,562

(22) Filed: May 23, 2008

(65) Prior Publication Data

US 2008/0299964 A1    Dec. 4, 2008

(30) Foreign Application Priority Data

May 23, 2007 (KR) .................. 10-2007-0050279

(51) Int. Cl.
*H04W 24/00* (2009.01)

(52) U.S. Cl. ......... 455/424; 455/63.3; 455/78; 455/83; 455/191.3; 455/199.1; 379/26.01; 379/412; 324/424; 700/28; 700/108; 702/69; 702/81; 702/108; 714/46

(58) Field of Classification Search .......... 455/424, 455/428, 560, 63.3, 78, 83, 191.3, 199.1; 379/26.01, 412; 340/635; 324/424, 600; 700/28, 39, 108, 116; 702/69, 81, 84, 108; 714/32, 46; 725/139

See application file for complete search history.

(56) References Cited

U.S. PATENT DOCUMENTS

| | | | | |
|---|---|---|---|---|
| 4,348,636 A | * | 9/1982 | Doundoulakis | 714/46 |
| 5,155,440 A | * | 10/1992 | Huang | 324/539 |
| 5,805,793 A | * | 9/1998 | Green | 714/32 |
| 2005/0130098 A1 | * | 6/2005 | Warner | 433/77 |
| 2008/0019501 A1 | * | 1/2008 | Miller et al. | 379/412 |

* cited by examiner

*Primary Examiner* — Shaima Q Aminzay
(74) *Attorney, Agent, or Firm* — Rothwell, Figg, Ernst & Manbeck, P.C.

(57) ABSTRACT

Disclosed herein is a transmission/reception channel matching apparatus for a mobile communication terminal and a mobile phone test equipment. The transmission/reception channel matching apparatus includes a Printed Circuit Board (PCB), a Dual In-line Package (DIP) switch, and a fastening casing. The PCB includes mobile communication terminal-side terminals to be electrically connected to option pins provided in the serial communication connector of the mobile communication terminal, and transmission and reception terminals corresponding to the transmission and reception channels of the mobile phone test equipment for transmitting a transmission signal to the mobile communication terminal and receiving a reception signal from the mobile communication terminal. The DIP switch is provided with a plurality of switches, is combined with the PCB, and selectively connects the mobile communication terminal-side terminals to the transmission and reception terminals depending on ON/OFF information. The fastening casing accommodates the PCB so that part of the DIP switch is exposed to the outside.

11 Claims, 4 Drawing Sheets

Fig. 4

| CLASSIFICATION | | Company K's W1xxx | Company S's SPH-S3xxx | Company K's EvD0-x | Company K's W2xxx |
|---|---|---|---|---|---|
| TX | 1 | - | - | - | - |
| | 2 | - | - | ON | - |
| | 3 | ON | - | - | ON |
| | 4 | - | ON | - | - |
| RX | 5 | ON | - | - | ON |
| | 6 | - | ON | - | - |
| | 7 | - | - | - | - |
| | 8 | - | - | ON | - |

TRANSMISSION/RECEPTION CHANNEL MATCHING APPARATUS FOR MOBILE COMMUNICATION TERMINAL AND MOBILE PHONE TEST EQUIPMENT

CROSS REFERENCE TO RELATED APPLICATIONS

This application claims priority from Korean Patent Application No. 10-2007-0050279 filed May 23, 2007, all of which is incorporated herein by reference in its entirety for all purposes.

BACKGROUND OF THE INVENTION

1. Field of the Invention

The present invention relates generally to an additional transmission/reception channel matching apparatus for a mobile communication terminal, and, more particularly, to a transmission/reception channel matching apparatus for a mobile communication terminal and a mobile phone test equipment that is capable of matching the transmission and reception channels of the mobile phone test equipment for measuring the call quality of the mobile communication terminal with additional serial communication channels, which that may vary with each mobile communication terminal.

2. Description of the Related Art

With the rapid development of mobile communication network technology and the popularization of mobile communication terminals, most people are using mobile communication terminals. Accordingly, mobile communication terminal technology is developing, and various functions are added or provided due to competition between mobile communication service providers to satisfy users' various demands. As an example, mobile communication terminals equipped with a Digital Multimedia Broadcasting (DMB) function enjoy such popularity that they account for an overwhelming majority of newly commercialized terminals.

Such mobile communication terminals are becoming personal multimedia devices because high-quality display and sound and high-capacity memory are demanded due to the provision of various additional functions and various types of content. Mobile communication service providers need to measure the call quality of terminals in order to manufacture terminals having superior performance, and mobile communication network operators need to measure call quality in order to measure and optimize the performance or state of provided mobile communication networks.

In a method of measuring call quality, a mobile communication terminal is connected to a mobile phone test equipment, and the mobile phone test equipment transmits a transmission signal for the measurement of call quality to the connected mobile communication terminal. The mobile communication terminal receives and processes the transmission signal and transmits a relevant reception signal to the mobile phone test equipment, and the mobile phone test equipment can measure call quality by analyzing the reception signal.

The connection between the mobile phone test equipment and the mobile communication terminal is set up chiefly through a serial communication port provided in the mobile communication terminal. The functions of respective pins of the serial communication port are standardized in accordance with the Korean Ministry of Information and Communication standard, and the functions of the respective pins are listed in the following Table 1:

TABLE 1

24-pin Type Terminal Pin Map based on Korean Ministry of Information and Communication Standard

| Pin number | Description |
|---|---|
| 1 | Battery ID |
| 2 | Hands-free mode |
| 3 | DSR |
| 4 | Power (+5.0 V) |
| 5 | Power (−5.0 V) |
| 6 | On switch |
| 7 | Audio In/PCM RX/DB RX |
| 8 | Option/PCM clock |
| 9 | Option/PCM sync |
| 10 | Option (USB RX) |
| 11 | Audio In/PXM RX/DM RX |
| 12 | Power GND |
| 13 | RXD |
| 14 | TXD |
| 15 | Option/USB TX |
| 16 | USB Power (+5.0 V/+3.3 V) |
| 17 | DCD |
| 18 | RI |
| 19 | Power GND |
| 20 | RTS |
| 21 | Power (+4.2 V) |
| 22 | Power (−4.2 V) |
| 23 | CTS |
| 24 | DTR |

Table 1 summarizes the functions of respective pins provided in the serial communication port of a mobile communication terminal based on the Korean Ministry of Information and Communication standard. As described in Table 1, the unique designated functions of all 24 pins, except for pin Nos. 7, 8, 9 and 11, have been standardized, and pin Nos. 7, 8, 9 and 11 are defined as option pins that can be freely used by mobile communication terminal manufacturers.

Accordingly, each of the terminal manufacturers, who manufacture products using additional serial communication channels, except for pin Nos. 13 and 14 used for standard serial communication, (representative examples include combined CDMA/WCDMA terminals and products in which DM and data communication ports are different from each other), selects two pins from among option pin Nos. 7, 8, 9 and 11 and sets and uses the two pins for relevant additional serial communication channels. Table 2 shows the use of the additional serial communication channels of representative mobile communication terminals.

TABLE 2

| Classification | Company K's W1xxx | Company S's SPH-S3xxx | Company K's EvD0-x | Company K's W2xxx |
|---|---|---|---|---|
| TX2 | No. 9 | No. 11 | No. 7 | No. 9 |
| RX2 | No. 8 | No. 7 | No. 11 | No. 8 |

However, since each manufacturer freely selects two pins from among option pins and sets the two pins for communication channels for each mobile communication model, a disadvantage arises in that dedicated connection cables corresponding to each mobile communication terminal must be provided in order to measure the call quality of various mobile communication terminals and mobile communication networks. That is, since pins set for transmission and reception channels in the terminal W1xxx of company K are different from pins set for transmission and reception channels in the terminal SPH-S3xxx of company S, as shown in Table 2, it is impossible to measure the call quality of the two terminals using the same connection cables.

SUMMARY OF THE INVENTION

Accordingly, the present invention has been made keeping in mind the above problems occurring in the prior art, and an object of the present invention is to provide a transmission/reception channel matching apparatus for a mobile communication terminal and a mobile phone test equipment that is capable of matching the additional serial communication channels of the mobile communication terminal, which are different for each mobile communication terminal manufacturer or each mobile communication terminal model, with the transmission and reception channels of the mobile phone test equipment.

Another object of the present invention is to provide a transmission/reception channel matching apparatus for a mobile communication terminal and a mobile phone test equipment that is capable of matching the transmission and reception channels of the mobile communication terminal with the transmission and reception channels of the mobile phone test equipment only through the simple On/Off manipulation of a Dual In-line Package (DIP) switch.

Still another object of the present invention is to provide a transmission/reception channel matching apparatus for a mobile communication terminal and a mobile phone test equipment that is capable of displaying the state of transmission/reception channel matching, thereby enabling a tester to visually monitor the state of transmission/reception channel matching between the mobile communication terminal and the mobile phone test equipment.

According to an aspect of the above-described present invention, when a tester connects a mobile communication terminal to a channel matching apparatus connected to a mobile phone test equipment to test the call quality of the mobile communication terminal, option pin Nos. 7, 8, 9 and 11 responsible for additional serial communication channels in a 24-pin serial communication connector provided in the mobile communication terminal are connected to the mobile communication terminal-side terminals of the channel matching apparatus.

The channel matching apparatus according to the present invention is provided with mobile communication terminal-side terminals connected to transmission and reception pins, assigned for transmission and reception channels among the above-described additional serial communication channels, in a one-to-one correspondence and switches configured to connect transmission and reception terminals corresponding to the transmission and reception channels of the mobile phone test equipment. Therefore, a tester can match the additional serial communication channels of the mobile communication terminal with the transmission and reception channels of the mobile phone test equipment through the manipulation of a DIP switch.

Preferably, a tester can connect mobile communication terminals having additional serial communication channels based on different standards to a mobile phone test equipment in such a way as to perform the On/Off operations of switches with reference to a channel matching table, which is provided along with a channel matching apparatus or is provided separately and in which the On/Off information of switches for the identification information of the mobile communication terminal is described.

Accordingly, the transmission/reception channel matching apparatus for a mobile communication terminal and a mobile phone test equipment according to the present invention has an advantage in that it enables tests of the quality of mobile communication terminals having different additional serial communication channels using a single channel matching apparatus only through manipulation in such a way as to manipulate switches, provided in the channel matching apparatus, with reference to a channel matching table, which is provided along with the channel matching apparatus or is provided separately.

According to still another aspect of the present invention, a transmission/reception channel matching apparatus for a mobile communication terminal and a mobile phone test equipment according to the present invention is provided with a display unit that displays the state of channel matching between the mobile communication terminal and the mobile phone test equipment. Accordingly, there is an advantage in that a tester can visually monitor the state of channel matching between the mobile communication terminal and the mobile phone test equipment.

BRIEF DESCRIPTION OF THE DRAWINGS

The above and other objects, features and advantages of the present invention will be more clearly understood from the following detailed description taken in conjunction with the accompanying drawings, in which:

FIG. 4 is a schematic channel matching table according to a preferred embodiment of the present invention.

DESCRIPTION OF THE PREFERRED EMBODIMENTS

Figure 1:
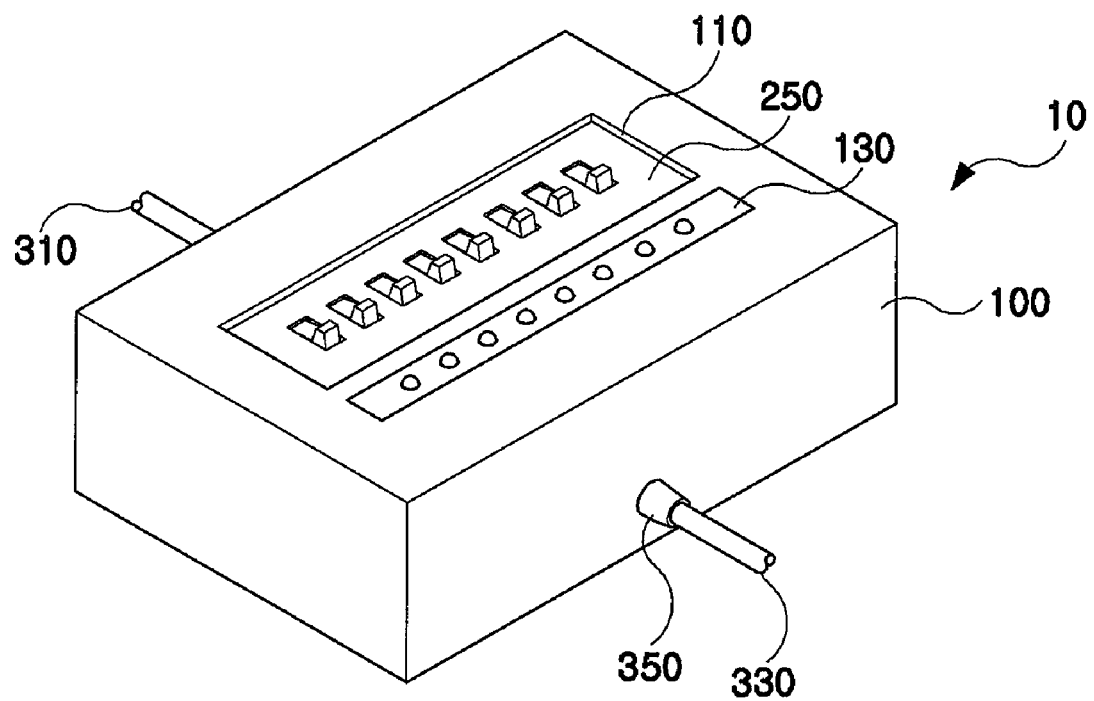
FIG. 1 is a perspective view schematically showing a transmission/reception channel matching apparatus for a mobile communication terminal and a mobile phone test equipment according to a preferred embodiment of the present invention.

Reference should be made to the drawings, in which the same reference numerals are used throughout the different drawings to designate the same or similar components.

The above-described and additional aspects of the present invention will be apparent through preferred embodiments that will be described with reference to the accompanying drawings. The present invention will be described in detail below so that those skilled in the art can easily understand and reproduce the present invention through the embodiments.

Figure 2:
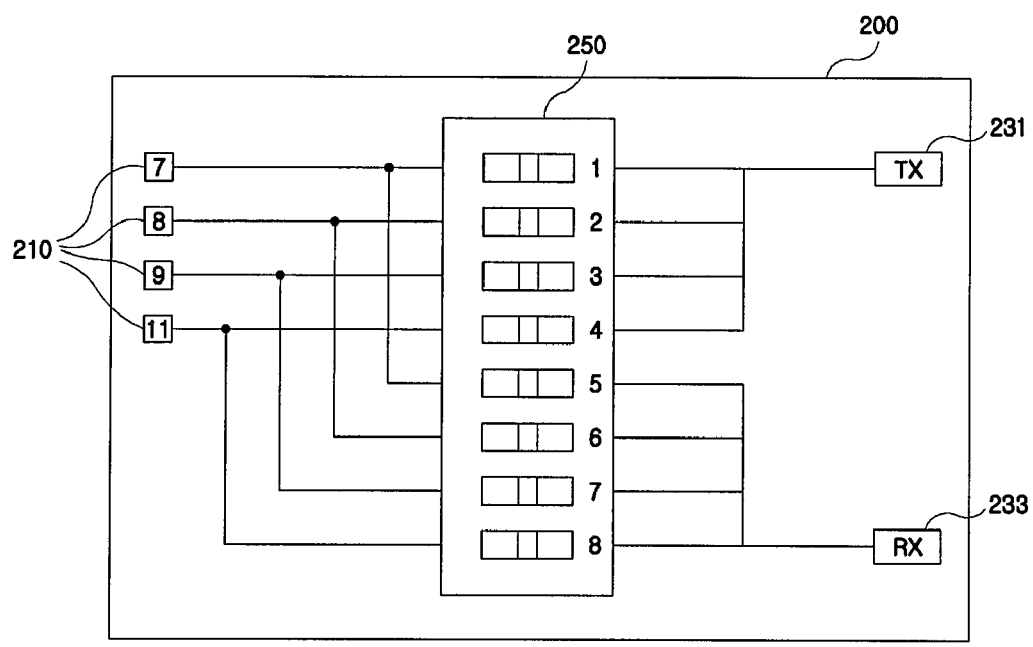
FIG. 2 is a schematic diagram showing a Printed Circuit Board (PCB) according to a preferred embodiment of the present invention.

FIG. 1 is a perspective view schematically showing a transmission/reception channel matching apparatus 10 for a mobile communication terminal and a mobile phone test equipment according to a preferred embodiment of the present invention. FIG. 2 is a schematic diagram showing a PCB 200 according to a preferred embodiment of the present invention. As shown in the drawings, the channel matching apparatus 10 according to the present invention includes the PCB 200 configured to include mobile communication terminal-side terminals 210 to be electrically connected to option pins provided in the serial communication connector of the mobile communication terminal, and transmission and reception terminals 231 and 233 corresponding to the transmission and reception channels of the mobile phone test equipment for transmitting a transmission signal to the mobile communication terminal and receiving a reception signal from the mobile communication terminal; a DIP switch 250 provided with a plurality of switches, combined with the PCB 200, and configured to selectively connect the mobile communication terminal-side terminals 210 to the transmission and reception terminals 231 and 233 depending on the ON/OFF information of the switches; and a fastening casing 100 configured to accommodate the PCB 200 so that part of the DIP switch 250 is exposed to the outside through the top thereof.

The PCB 200 is provided with switches for electrically connecting the mobile communication terminal-side terminals 210, connected to transmission and reception pins responsible for transmission and reception channels among the additional serial communication channels of the target mobile communication terminal, with the transmission and reception terminals 231 and 233 of the channel matching apparatus 10 corresponding to the transmission and reception channels of the mobile phone test equipment. Accordingly, a tester can perform channel matching between mobile communication terminals having different additional serial communication channels and the mobile phone test equipment only through the manipulation of the switches.

The mobile communication terminal-side terminals 210 are terminals that are electrically connected to, for example, option pins provided in the serial communication connector of a mobile communication terminal. The transmission and reception terminals 231 and 233 are terminals that correspond to transmission and reception channels for transmitting a transmission signal output to the mobile communication terminal and receiving a reception signal from the mobile communication terminal in order to perform measurement on the mobile communication terminal using the mobile phone test equipment.

The DIP switch 250 is a switch that is combined with a circuit board and is used to change the functions of hardware. The DIP switch 250 is used to variably set the initial values of a computer, a peripheral device or the like.

The DIP switch 250 is implemented as a single module so that it is detachably attached to the PCB 200. Accordingly, even when a breakdown occurs in the DIP switch 250 due to the frequent manipulation of the switch, the channel matching apparatus 10 can continue to be used after the replacement of only the DIP switch 250 without the need for the replacement of the entire channel matching apparatus 10. Accordingly, connector holes corresponding to relevant connector pins are formed in the PCB 200 so that the connector pins of the DIP switch 250 are inserted into and combined with the connector holes. Since the technology for performing combination using the connector pins of the DIP switch 250 and the connector holes of the PCB 200 is a widely used technology, a detailed description thereof is omitted here.

The fastening casing 100 is a kind of casing that is used to fasten and protect the PCB 200 provided therein, a mobile communication terminal-side cable 310 composed of lead wires for the option pins of the mobile communication terminal, which are connected to the mobile communication terminal-side terminals 210 of the PCB 200, and a mobile phone test equipment-side cable 330 composed of lead wires corresponding to the transmission and reception channels of the mobile phone test equipment connected to the transmission and reception terminals 231 and 233 of the PCB 200.

Cable holes, through which the mobile communication terminal-side cable 310 connected to the mobile communication terminal and the mobile phone test equipment-side cable 330 connected to the mobile phone test equipment pass, are formed through two sides of the fastening casing 100, and an opening 110, through which the DIP switch 250 for performing transmission/reception channel matching between the mobile communication terminal and the mobile phone test equipment is exposed to the outside, is formed through the top of the fastening casing 100.

The opening 110 may be configured to allow the entire DIP switch 250 to protrude therethrough so that the DIP switch 250 can be attached and detached through the opening 110 as described above.

As a result, a tester can connect the additional serial communication channels of the mobile communication terminal, which are differently set for each manufacturer or each model, to the transmission and reception channels of the mobile phone test equipment through the manipulation of the switches of the DIP switch 250, which is exposed to the outside through the opening 110.

According to an additional aspect of the present invention, a transmission/reception channel matching apparatus 10 for a mobile communication terminal and a mobile phone test equipment according to the present invention further includes a display unit 130 that has elements corresponding to respective switches of the DIP switch 250 and displays the state of transmission/reception channel matching between the mobile communication terminal and the mobile phone test equipment.

The display unit 130 may be implemented using light emitting devices, such as Light Emitting Diodes (LEDs). Here, a tester can be aware of the state of transmission/reception channel matching between the mobile communication terminal and the mobile phone test equipment in such a way that the color of LEDs corresponding to switch Nos. 1 to 4 for transmission channel matching is made different from that of LEDs corresponding to switch Nos. 5 to 8 for reception channel matching.

Furthermore, it is preferred that the display unit 130 be provided on the fastening casing 100 at a location opposite to that of the switches of the DIP switch 250 so as to assist in a tester's visual monitoring.

According to an additional aspect of the present invention, a transmission/reception channel matching apparatus 10 for a mobile communication terminal and a mobile phone test equipment according to the present invention further includes cable connection units 350 for performing tight connection between the fastening casing 100, the mobile communication terminal-side cable 310 and the mobile phone test equipment-side cable 330. The cable connection unit 350 realizes tight connection between the cables and the PCB 200 by providing the insulation of the cables and attenuating external force such as external impact.

Figure 3:
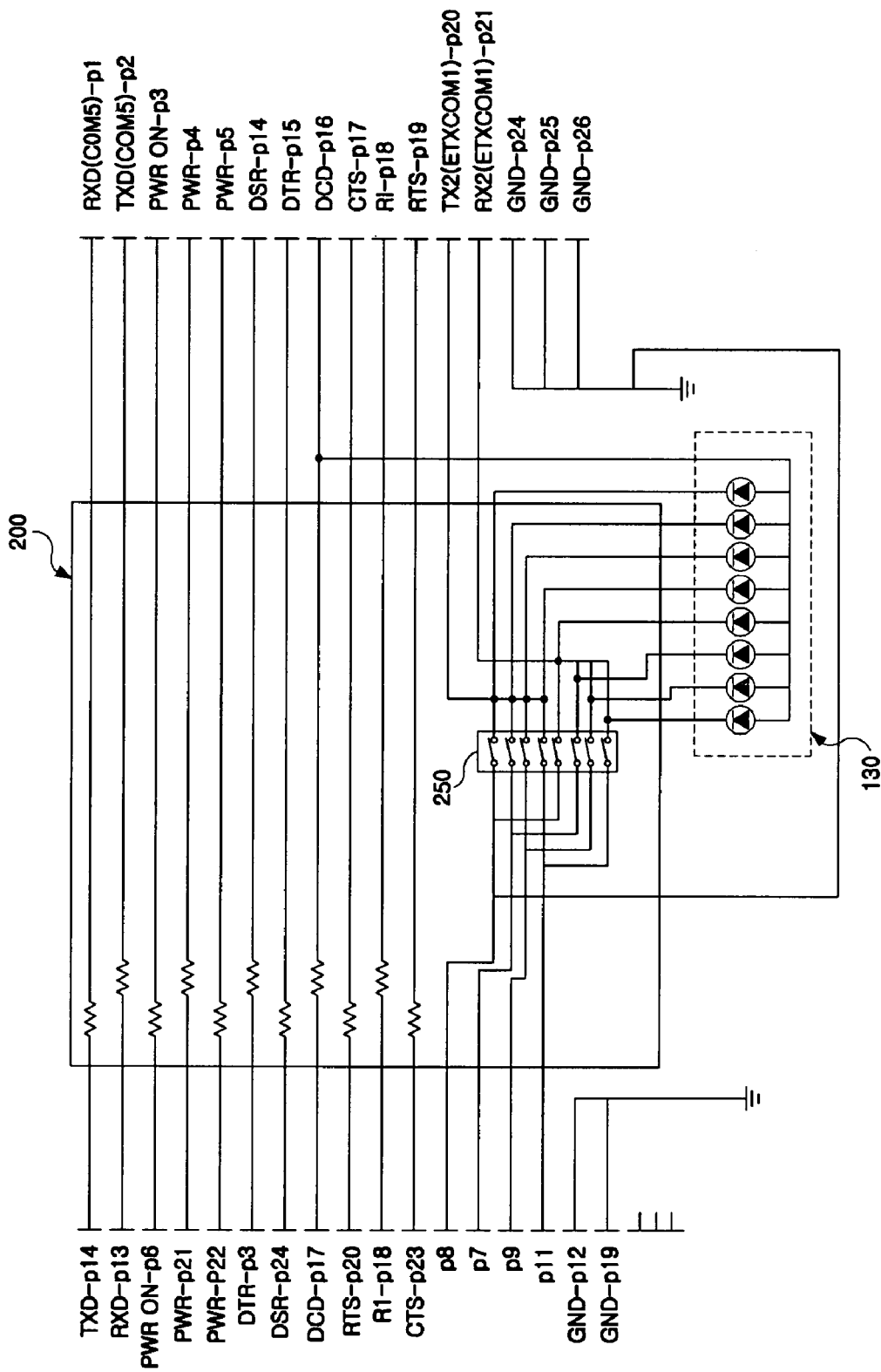
FIG. 3 is a circuit diagram schematically showing a PCB according to a preferred embodiment of the present invention.

The PCB 200 according to the present invention will be described in detail below with reference to FIGS. 2 to 4. FIG. 3 is a circuit diagram schematically showing a PCB according to a preferred embodiment of the present invention, and FIG. 4 is a schematic channel matching table according to a preferred embodiment of the present invention. As shown in these drawings, the DIP switch 250 is combined with the PCB 200 according to the present invention, and the corresponding DIP switch 250 may be, for example, an 8-channel switch having 8 switches.

The first ends of the 8 switches of the DIP switch 250 are connected to the 4 channels of the mobile communication terminal-side terminals 210 connected to the option pins of the mobile communication terminal, and the second ends of switch Nos. 1 to 4 are connected to the transmission terminal (TX) 231 corresponding to the transmission and reception channels of the mobile phone test equipment. Furthermore, the second ends of switch Nos. 5 to 8 are connected to the reception terminal (RX) 233 corresponding to the transmission and reception channels of the mobile phone test equipment. Accordingly, a tester sets the transmission and reception channels of the mobile communication terminal and the mobile phone test equipment in such a way as to check the On/Off information of switch Nos. 1 to 8 in the channel matching table and perform manipulation in order to perform the matching of additional serial communication channels different for each mobile communication terminal manufacturer or each mobile communication terminal model, as shown in FIG. 4.

A process of connecting cables using the above-described transmission/reception channel matching apparatus 10 for a mobile communication terminal and a mobile phone test equipment according to the present invention will be described using an example. When a tester connect the channel matching apparatus 10 to the mobile phone test equipment and connects the mobile communication terminal-side terminals 210 to the mobile communication terminal in order to measure the call quality of a mobile communication terminal that has the model name "W1xxx" and was manufactured by company K, the mobile communication terminal-side terminals 210 are electrically connected to the option pins of the mobile communication terminal.

When the connection to the mobile communication terminal is completed, the tester turns on the switch Nos. 3 and 5 and turns off the remaining switches to realize transmission/reception channel matching between the mobile communication terminal and the mobile phone test equipment with reference to a channel matching table, such as that shown in FIG. 4, which is provided along with the channel matching apparatus 10 or is provided separately.

Accordingly, the transmission terminal 231 is electrically connected to the channel No. 9 of the mobile communication terminal-side terminals 210 through the turning on of the switch No. 3, and thus the matching of a transmission channel for a signal output to the mobile communication terminal is accomplished. Furthermore, the reception terminal 233 is electrically connected to the channel No. 8 of the mobile communication terminal-side terminals 210 through the turning on of the switch No. 5, and thus the matching of a reception channel for a reception signal transmitted from the mobile communication terminal is accomplished.

The transmission/reception channel matching apparatus for a mobile communication terminal and a mobile phone test equipment according to the present invention has an advantage in that it is possible to measure the call quality of mobile communication terminals having different additional serial communication channels using a single channel matching apparatus only through manipulation in such a way as to manipulate switches, provided in the channel matching apparatus, with reference to the channel matching table, which is provided along with the channel matching apparatus or is provided separately.

Furthermore, the transmission/reception channel matching apparatus for a mobile communication terminal and a mobile phone test equipment according to the present invention has an advantage in that it is provided with a display unit for displaying the state of channel matching between the mobile communication terminal and the mobile phone test equipment, and thus a tester can visually monitor the state of transmission/reception channel matching between the mobile communication terminal and the mobile phone test equipment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A transmission/reception channel matching apparatus for a mobile communication terminal and a mobile phone test equipment, the transmission/reception channel matching apparatus comprising:
   a Printed Circuit Board (PCB) comprising (i) mobile communication terminal-side terminals configured to be electrically connected to option pins provided in a serial communication connector of the mobile communication terminal, and (ii) transmission and reception terminals corresponding to transmission and reception channels of the mobile phone test equipment for transmitting a transmission signal to the mobile communication terminal and receiving a reception signal from the mobile communication terminal;
   a Dual In-line Package (DIP) switch provided with a plurality of switches, combined with the PCB, and configured to selectively connect the mobile communication terminal-side terminals to the transmission and reception terminals depending on ON/OFF information of the switches; and
   a fastening casing configured to accommodate the PCB so that part of the DIP switch is exposed to an outside through a top thereof.

2. The transmission/reception channel matching apparatus as set forth in claim 1, wherein the DIP switch is detachably attached to the PCB.

3. The transmission/reception channel matching apparatus as set forth in claim 2, further comprising a display unit that has elements corresponding to respective switches of the DIP switch and displays a state of transmission/reception channel matching.

4. The transmission/reception channel matching apparatus as set forth in claim 2, further comprising cable connection units that realize tight connection between a mobile communication terminal-side cable and a mobile phone test equipment-side cable connected to the mobile communication terminal-side terminals and transmission and reception terminals of the PCB.

5. The transmission/reception channel matching apparatus as set forth in claim 3, wherein the display unit is formed of Light Emitting Diodes (LEDs).

6. The transmission/reception channel matching apparatus as set forth in claim 3, further comprising cable connection units that realize tight connection between a mobile communication terminal-side cable and a mobile phone test equipment-side cable connected to the mobile communication terminal-side terminals and transmission and reception terminals of the PCB.

7. The transmission/reception channel matching apparatus as set forth in claim 5, wherein the LEDs have different colors respectively for transmission channels and for reception channels.

8. The transmission/reception channel matching apparatus as set forth in claim 5, further comprising cable connection units that realize tight connection between a mobile communication terminal-side cable and a mobile phone test equipment-side cable connected to the mobile communication terminal-side terminals and transmission and reception terminals of the PCB.

9. The transmission/reception channel matching apparatus as set forth in claim 1, further comprising cable connection units that realize tight connection between a mobile communication terminal-side cable and a mobile phone test equipment-side cable connected to the mobile communication terminal-side terminals and transmission and reception terminals of the PCB.

10. In a system having a mobile communication terminal, a mobile phone test equipment and a transmission/reception channel matching apparatus, wherein (i) mobile communication terminal-side terminals of a Printed Circuit Board (PCB) of the transmission/reception channel matching apparatus are connected to option pins provided in a serial communication connector of the mobile communication terminal, (ii) a transmission terminal of the PCB of the transmission/reception channel matching apparatus is connected to a transmission channel, which is for transmitting a transmission signal to the mobile communication terminal, of the mobile phone test equipment and (iii) a reception terminal of the PCB of the transmission/reception channel matching apparatus is connected to a reception channel, which is for receiving a reception signal to from the mobile communication terminal, of the mobile phone test equipment, a method performed by the transmission/reception channel matching apparatus for matching transmission and reception channels of the mobile phone test equipment to particular option pins of the option pins provided in a serial communication connector of a mobile communication terminal, the method comprising:

connecting, by the transmission/reception channel matching apparatus, the transmission terminal of the PCB of the transmission/reception channel matching apparatus to a first one of the mobile communication terminal-side terminals of the PCB of the transmission/reception channel matching apparatus, wherein the first one of the mobile communication terminal-side terminals of the PCB of the transmission/reception channel matching apparatus is chosen depending on ON/OFF information of a plurality of switches of a Dual In-Line Package (DIP) combined with the PCB; and connecting, by the transmission/reception channel matching apparatus, the reception terminal of the PCB of the transmission/reception channel matching apparatus to a second one of the mobile communication terminal-side terminals of the PCB of the transmission/reception channel matching apparatus, wherein the second one of the mobile communication terminal-side terminals of the PCB of the transmission/reception channel matching apparatus is chosen depending on ON/OFF information of the plurality of switches of the DIP combined with the PCB.

11. The method of claim 10, further comprising displaying, by the transmission/reception channel matching apparatus, a state of transmission/reception channel matching in a display unit of the transmission/reception channel matching apparatus.

* * * * *